D. SPRINGER.

Apparatus for Taming Horses.

No. 131,978.　　　　　　　　　　Patented Oct. 8, 1872.

ATTEST:
Harry S. Sprague
H. F. Eberts

INVENTOR:
D. Springer
By Atty
Thos. S. Sprague

UNITED STATES PATENT OFFICE.

DANIEL SPRINGER, OF PONTIAC, MICHIGAN.

IMPROVEMENT IN APPARATUS FOR TAMING HORSES.

Specification forming part of Letters Patent No. 131,978, dated October 8, 1872.

*To all whom it may concern:*

Be it known that I, DANIEL SPRINGER, of Pontiac, in the county of Oakland and State of Michigan, have invented a new and useful Improvement in an Apparatus for Taming and Training Horses; and I do declare that the following is a true and accurate description thereof, reference being had to the accompanying drawing and to the letters of reference marked thereon, and being a part of this specification, in which—

Figure 1:
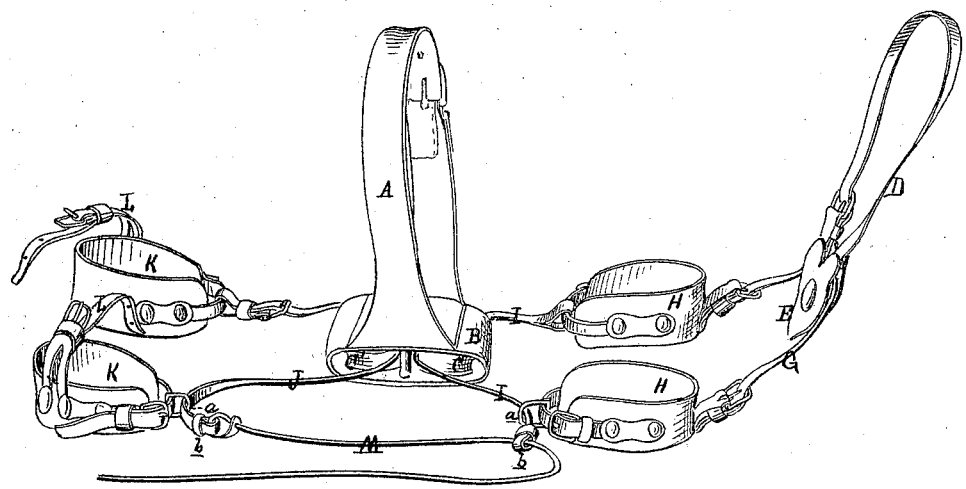
Figure 2:
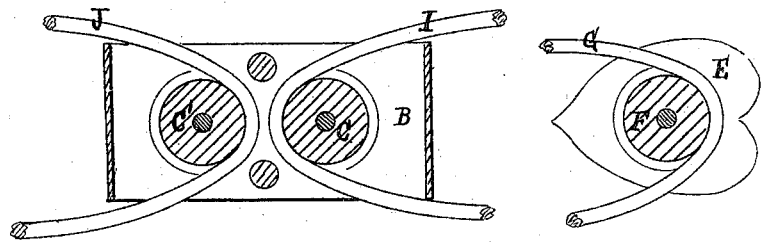
Figure 3:
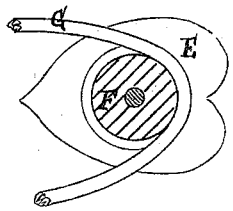

Figure 1 is a perspective view of my apparatus extended, showing the relative positions of the several parts when attached to a trotting horse; Fig. 2 is a horizontal section of the center sheave-frame; and Fig. 3 is a similar section of the breast sheave-plate.

Like letters refer to like parts in each figure.

The object of this invention is to provide a cheap and simple apparatus to be adjusted to a horse for the purpose of preventing him from moving in any other gait than a trot when moving faster than a walk, preventing him from using any other gait as well as precluding the possibility of his rearing, jumping, pitching, or kicking; and also to a device for drawing his legs under him, in case he acts violently or attempts to run away. The invention consists, first, in the peculiar construction of an apparatus secured under the horse and provided with certain straps to engage with the fore-arms and thighs of the animal for compelling an alternating movement of the limbs of each side; and, second, in connection therewith, a device for drawing the four legs under him when so desired.

In the drawing, A represents a girt, which is passed around and firmly belted to the animal in rear of the belly-band. To the under side of the lower center of this girt there is secured, by riveting or otherwise, a sheave-frame, B, composed of two horizontal plates of metal, covered with leather, and having journaled between them two sheaves, C C', the former in front and the latter behind the center of the frame. D is a strap, which goes over the neck of the horse and has attached to it a sheave plate, E, substantially like the first in construction, except that it has but one sheave, F. This plate E lies on the upper part of his breast. G is a strap rove through the sheave-frame E in front of its sheave, and has attached to each end a leather boot or sleeve, H, which buckles around the fore-arm. To each sleeve is secured one end of a strap, I, which is rove through the center-frame B, behind the front sheave thereof. These straps G and I are provided with buckles, so that they may be adjusted with relation to the sleeves and center sheave-frame in such a way that the animal can only move his fore-legs alternately, the strap I playing behind and around its sheave, or reciprocating as he moves his fore-legs alternately, and thus prevents him from advancing both fore-legs simultaneously. J is a strap, rove through the frame B in front of the sheave C', and has attached to each end a sleeve, K, which buckles around the thighs. These sleeves, by means of straps L, are secured to the breeching or hold-back, as preferred, and the strap J is so adjusted by means of its buckles to the sleeves that the animal can only move his hind-legs alternately; he cannot throw both of them back at once, and so prevents him from kicking. When the apparatus is properly adjusted he can only move the near fore-leg simultaneously with the off hind-leg, and thus he is prevented from assuming any other gait than a trot or pace, no matter what his usual gait may have been.

When applied to trotting horses it prevents them from breaking from the trot to the run or gallop.

To subdue a fractious horse, disposed to be ugly or run away, one end of each of the straps I and J at the side is led through a ring, a, and provided with a stop-collar, b, to prevent them from being drawn out. To the end of the strap J there is secured a round line, M, which is led through an eye on the protruding end of the strap I and carried back to the driver's seat and secured within convenient reaching distance, so that when the animal is fractious by pulling on this line M the four limbs will be drawn nearly together under the animal, and then if he moves at all he must take short steps. If necessary, the horse can be thrown entirely off his feet with this device, so that a few applications will subdue the most vicious animal.

The various straps are adjustable through their buckles, so that the apparatus may be adjusted to all sizes of horses.

What I claim as my invention, and desire to secure by Letters Patent, is—

1. The girt A, sheave-frame B, sheaves C C', sheave-plate E, sheave F, sleeves H H K K, straps D G, I J, and L L, constructed, arranged, and operating substantially as described, for the purpose specified.

2. The arrangement of the straps I and J, at one side, with relation to the rings $a\ a$ of the sleeves at that side, and the line M, as and for the purpose set forth.

DANIEL SPRINGER.

Witnesses:
H. F. EBERTS,
H. S. SPRAGUE.